Jan. 18, 1966     O. C. HANSEN ETAL     3,229,955
ADJUSTABLE VEHICLE SEAT AND ACTUATING MECHANISM THEREFOR
Filed Oct. 23, 1961     4 Sheets-Sheet 4
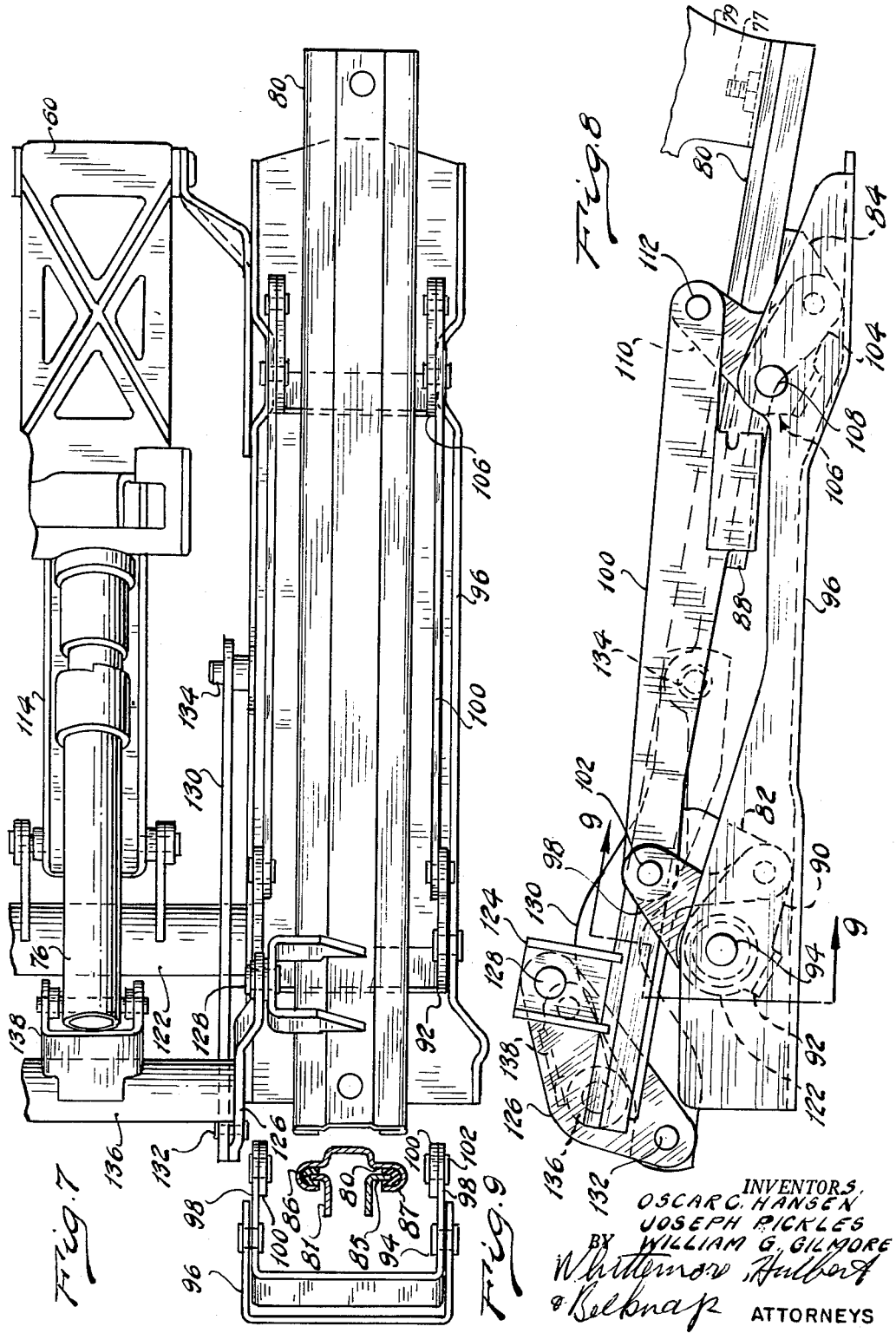
INVENTORS.
OSCAR C. HANSEN
JOSEPH PICKLES
WILLIAM G. GILMORE
BY Whittemore Hulbert
& Belknap
ATTORNEYS United States Patent Office 3,229,955
Patented Jan. 18, 1966

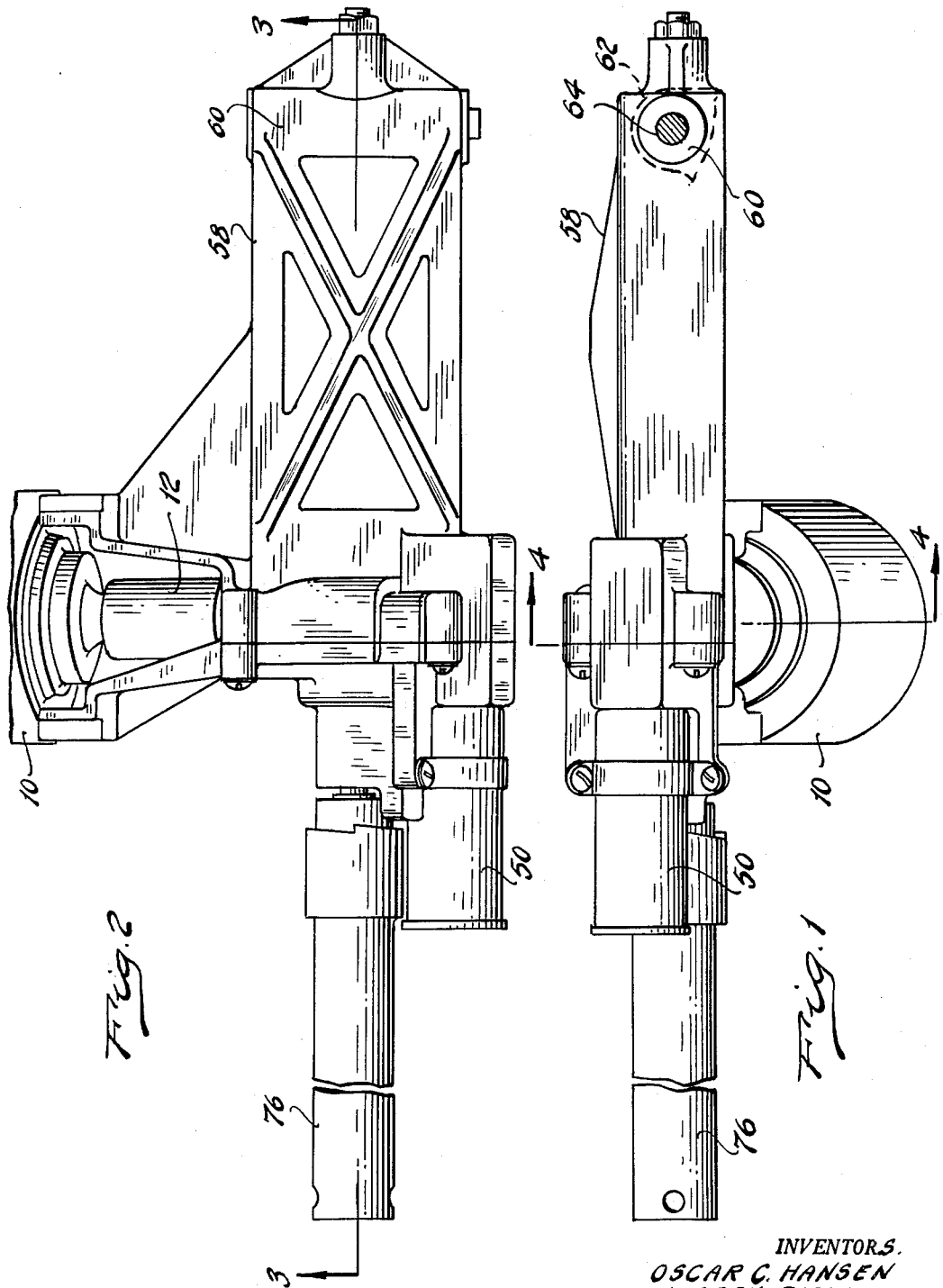

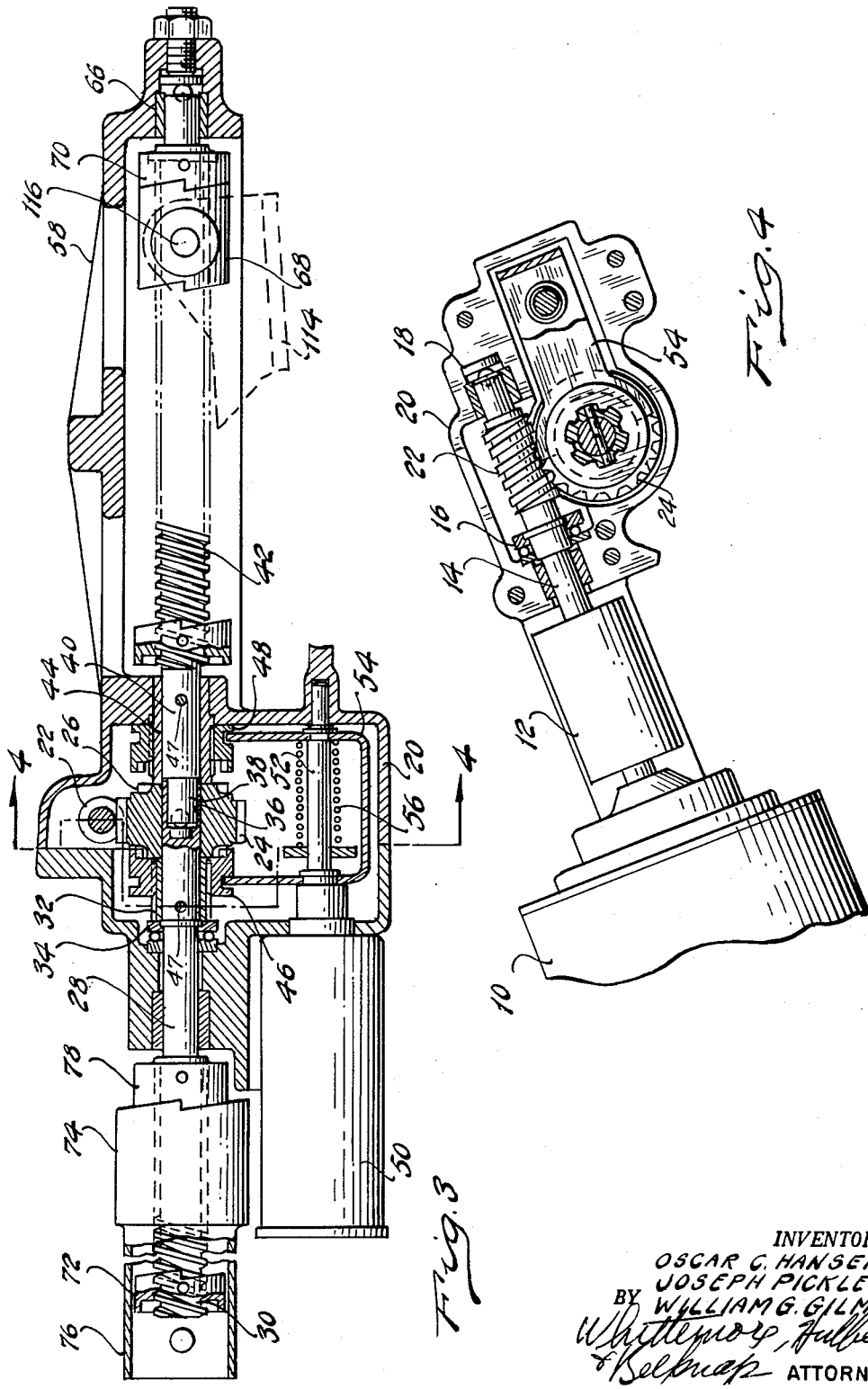

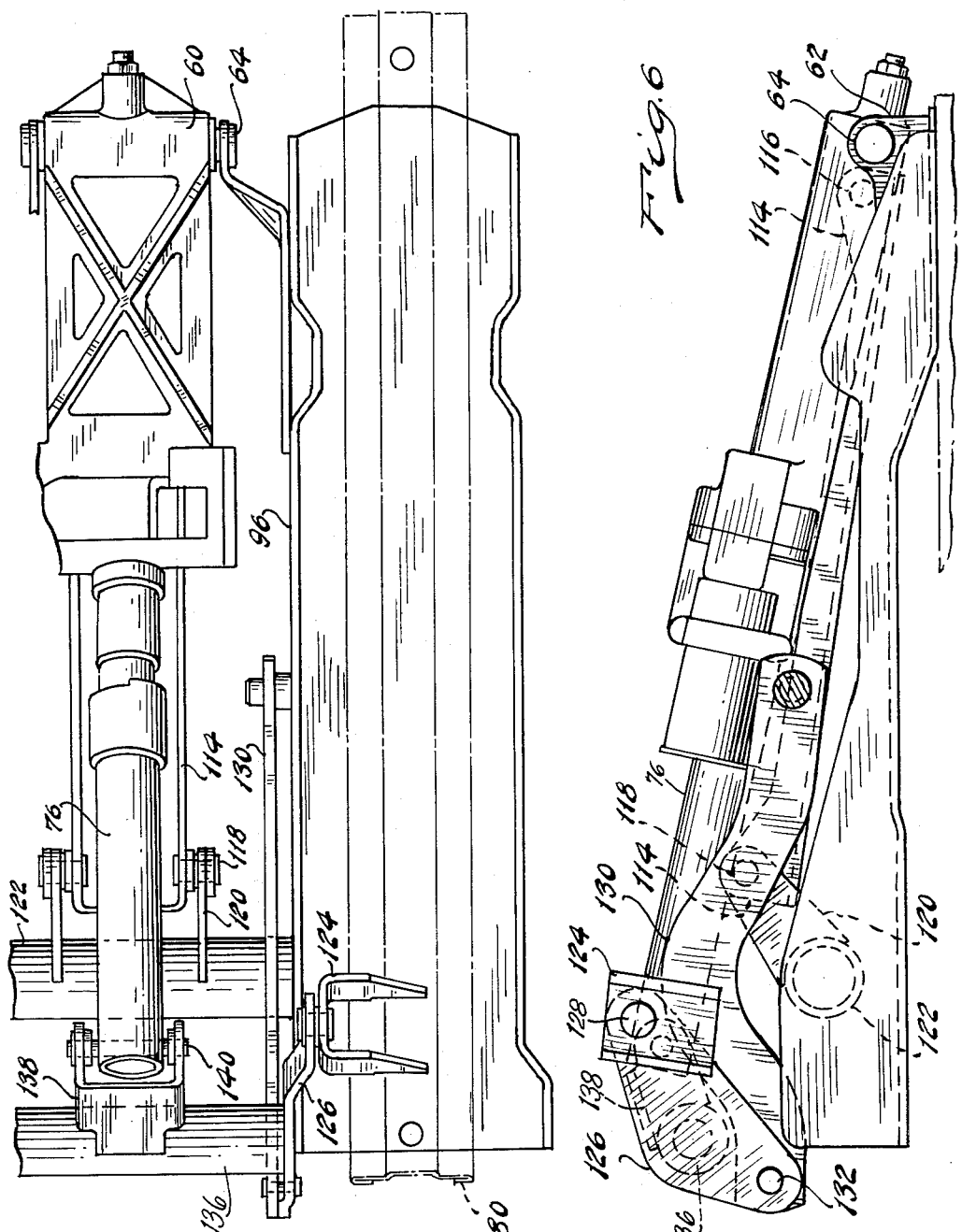

3,229,955
ADJUSTABLE VEHICLE SEAT AND ACTUATING MECHANISM THEREFOR
Oscar C. Hansen, Detroit, Joseph Pickles, Dearborn, and William Gilmore, Detroit, Mich., assignors to Ferro Manufacturing Corporation, a corporation of Michigan
Filed Oct. 23, 1961, Ser. No. 146,983
9 Claims. (Cl. 248—419)

The present invention relates to an adjustable vehicle seat and actuating mechanism therefor.

It is an object of the present invention to provide adjustable seat support mechanism including means for effecting generally vertical adjustment of the seat and generally horizontal adjustment of the seat, including a single electric motor, a pair of nut and screw actuating devices, and clutch means for selectively coupling the devices to the motor.

It is a further object of the present invention to provide a power actuated adjustable seat comprising a base, a seat support slide rail, front and rear rail supports on which said rail is slidable, adjustable levers interconnecting said rail supports and said base, a power adjusting unit comprising a pair of aligned nut and screw actuating devices each comprising relatively rotatable nut and screw members one of which is supported against axial movement so as to impart movement to the other of said members upon relative rotation therebetween, clutch means for selectively energizing said devices, means mounting said power adjusting unit for rocking movement about an axis extending transversely to the axes of said actuating devices, first linkage means connecting one of said devices to said levers to effect generally vertical movement of said front and rear rail supports and the slide rail thereon, second linkage means interconnecting the other of said actuating devices to said rail to effect general front to rear movement of said rail in any position of vertical adjustment thereof.

It is a further object of the present invention to provide a power adjusting unit comprising a reversible electric motor, a clutch member geared to said motor, a pair of aligned threaded shafts extending in opposite directions from said clutch member, and a shiftable clutch element associated with each of said shafts for coupling it to said clutch member, nuts threaded to said shafts, and movable means connected to said nuts to prevent rotation thereof and to be moved thereby parallel to the axes of said shafts.

Other objects and features of the invention will become apparent as the description proceeds, especially when taken in conjunction with the accompanying drawings, illustrating a preferred embodiment of the invention, wherein:

FIGURE 1 is a side elevational view of a power actuated unit constructed in accordance with the present invention.

FIGURE 2 is a plan view of the power actuated unit shown in FIGURE 1.

FIGURE 3 is a vertical section through the power actuated unit with the solenoid clutch actuator shown out of position for clarity.

FIGURE 4 is an end view of the power actuated unit with parts broken away.

FIGURE 5 is a fragmentary plan view of a portion of the seat supporting and adjusting mechanism showing particularly, its connection to the power actuated unit.

FIGURE 6 is a fragmentary elevational view of the structure shown in FIGURE 5.

FIGURE 7 is a fragmentary plan view of the seat supporting and adjusting mechanism, omitting certain parts shown in FIGURE 5, and showing additional parts, for clarity.

FIGURE 8 is a fragmentary elevational view of the structure shown in FIGURE 7.

FIGURE 9 is a fragmentary section on the line 9—9, FIGURE 8.

Referring first to FIGURES 1–4, the power adjusting unit comprises an electric motor 10 connected through a coupling 12 to a shaft 14 supported by a bearing 16 and a thrust bearing 18 in a housing 20. Keyed or otherwise secured to the shaft 14 is a worm 22 in constant mesh with a worm gear 24. Opposite ends of the worm gear 24 are shaped to provide clutch teeth indicated at 26 in FIGURE 3.

Journaled in the housing 20 is a shaft 28 the outer end of which is provided with screw threads 30. The inner end of the shaft 28 extends through a central opening in the worm gear 26 and constitutes a support therefor. The worm gear 26 is supported on the shaft against endwise movement by an externally splined spacing sleeve 32 which engages one race of a bearing indicated generally at 34. The right hand end of the shaft 28, as seen in FIGURE 3, is provided with a recess 36 into which extends the reduced end portion 38 of a second shaft 40 the outer end of which is provided with the screw threads indicated at 42. An externally splined spacer sleeve 44 is provided on the shaft 40 and engages the right hand end of the worm gear 24. The sleeves 32 and 44 thus support the worm gear 24 against endwise movement and the worm gear 24 is freely rotatable on the inner end of shaft 28.

Slidable on the splined sleeves 32 and 44 are a pair of internally splined clutch elements 46 and 48 respectively as best illustrated in FIGURE 3. Each of these splined sleeves 32 and 44 is suitably pinned to the respective shafts as indicated by the numeral 47 in FIGURE 3 so that when the clutch elements 46 and 48 are driven in rotation by engagement with the clutch teeth 26 of the worm gear 24, the corresponding shaft together with its screw threaded portion is driven in rotation.

Means are provided for selectively coupling clutch elements 46 and 48 to the worm gear 24 and this means comprises a solenoid 50 having a plunger 52 carrying an actuating yoke 54 end portions of which are received in annular grooves in the clutch elements 46 and 48. A spring 56 is associated with the yoke urging it to the position illustrated in FIGURE 3. When the windings of solenoid 50 are energized the plunger therein is moved to the left, thus disengaging clutch element 46 and engaging clutch element 48.

The housing 20 includes a laterally extending strut portion indicated generally at 58, and at its outer end it is provided with a pivot mounting 60 by means of which the entire power adjusting unit is mounted to a support bracket 62 for rocking movement about the axis of a pivot pin, a portion of which is indicated at 64.

As best seen in FIGURE 3, the outer end of the shaft 40 is journaled as indicated at 66 in the strut portion 58, and carries a nut 68 whose purpose will presently be described. Fixed to the shaft 40 is an abutment 70 engageable by one end of the nut 68 when it reaches a limit of travel.

The shaft 28 at its outer end carries a similar fixed abutment 72 and threaded on the screw threaded portion 30 of the shaft 28 is a nut molded integrally with an enlarged portion 74 of a tubular sleeve 76. The enlarged portion of the sleeve 74 in which the nut is molded is engageable with a second abutment 78 fixedly carried by the shaft 28 to limit movement of the sleeve thereon.

Referring more particularly to FIGURES 5–8, the seat supporting and adjusting mechanism comprises a pair of mechanisms designed to extend in a generally fore and aft direction at opposite ends of the front seat of the vehicle. The adjustments contemplated are substantially vertical movement of the seat and substantially horizontal movement of the seat in a front to rear direction. This type of seat adjustment is referred to in the trade as a "four-way" adjustment. Difficulty is encountered in providing perfect freedom of substantial adjustment in all positions of horizontal adjustment and vice-versa. In the present construction this freedom of movement is provided by a novel arrangement of links and levers as will presently be described. However, before describing the detailed mechanism, it is pointed out that in general the adjusting support mechanisms at opposite ends of the seat are identical and therefore, only one of these will be described in detail. On the other hand, it is essential to avoid jamming that provision be made for simultaneously identical adjustment of the supporting and adjusting mechanisms, and for this purpose a pair of torsion bars is provided extending transversely of the vehicle and associated respectively with correponding elements of the seat adjusting mechanism.

Referring more specifically to FIGURES 7–9, opposite ends of the vehicle seat are connected to and movable with slide rails 80 as is conventional in the art. FIGURE 8 shows the rear portion 79 of the vehicle seat and support structure mounted on a threaded fastener 77 carried by the back end of the slide rail 80. The rails 80 are each slidable on an elongated track 81. The track includes an integrally formed front support bracket 82 and an integrally formed rear support bracket 84. The track 81, as best seen in FIGURE 9, includes laterally outwardly extending flange portions 85 carrying bearings or runners 86 formed of a suitable plastic such as Delrin. These runners are received in confronting channel portions 87 provided at the edges of the rails 80.

The front support bracket 82 is connected to a downwardly and rearwardly extending arm 90 of a bell crank 92 which is provided with a fixed pivot connection 94 to the stationary mounting channel 96. The bell crank 92 includes an upwardly and rearwardly extending arm 98 which is connected to a link 100 by a pivot connection indicated at 102.

In like manner, the rear support bracket 84 is connected to the downwardly and rearwardly extending arm 104 of the bell crank 106 which is pivoted as indicated at 108 to the stationary mounting channel 96. The bell crank 106 includes an upwardly and rearwardly extending arm 110 which is connected to the rear end of the link 100 by a pivot connection 112. From the foregoing it will be observed that if rocking movement is imparted to either of the bell cranks 92 or 106, the other bell crank is given a similar rotation through the link 100. Moreover, similar rotation of the bell cranks 92 and 106 effects generally vertical movement of the front and rear support brackets 82 and 84 so that a seat, the ends of which are supported by rails 80, is given vertical adjustment.

The mechanism for effecting rotation of the bell cranks 92 and 106 comprises a channel-shaped link 114 a portion of which is seen in FIGURE 3, the rear end of the link being provided with a pivot connection 116 with the nut 68. The front end of the link 114 is provided with a pivot connection 118 with an arm 120 fixed to a torsion bar 122 journaled in the mounting channel 96. At its opposite ends the torsion bar 122 has the bell cranks 92 fixedly secured thereto. Accordingly, when the clutch element 48 is engaged to rotate the shaft 40, the nut 68 is advanced axially of the shaft imparting generally fore and aft motion to the link 114. This in turn imparts rotation to the torsion bar 122 rocking the bell cranks 92 at the front of the seat supporting and adjusting mechanism. Rotation of these bell cranks imparts a lifting motion to the front support brackets 82 and imparts a corresponding rotation to the rear bell cranks 106 which in turn imparts corresponding vertical movement to the rear support brackets 84. This in turn results in generally vertical movement of the slide rails 80 and the seat constructions connected thereto.

In order to effect fore and aft movement of the slide rails 80 on the track 81, each of the rails is provided with a bracket 124. The brackets 124 are connected to links 126 by pivots 128, the links 126 being pivoted to stabilizing links 130 by pivot connections indicated at 132. The stabilizing links 130 are provided with an upwardly extending offset portion to provide clearance for the torsion bar 122, and the rear end of the links 130 is provided with a pivot connection 134 with a side wall of the mounting channel 96. Intermediate their ends the links 126 are fixedly connected to torsion bar 136.

Intermediate the mounting channels 96 the torsion bar 136 is provided with a channel-shaped actuating arm 138 which is provided with a pivot connection 140 to the front end of the tubular sleeve 76.

When the clutch mechanism is in the position illustrated in FIGURE 3, actuation of the motor 10 results in rotation of the screw threaded portion of the shaft 28, resulting in forward or rearward movement of the tubular sleeve 76. This in turn, through the arm 138, applies a force to the torsion bar 136 which is to the left, as best ilustrated in FIGURE 8. Since the torsion bar is fixedly mounted to link 126, and since the link 126 has its lower end attached by a pivot connection to the forward end of the rigid link 130, this force tends to cause the link 126 to rock counterclockwise about the pivot 132. This motion alone would elevate the bracket 124 and the front end of the rail 80. In order to prevent this the actual resulting movement of the associated parts is a movement of the pivot connection 128, the bracket 124, and hence the slide 80, in a direction parallel to the instantaneous position of the slide as determined by the instantaneous position of the brackets 82 and 84. This accordingly, results in a downward movement of the torsion bar 136 and of the forward ends of the stabilizing links 130.

With this arrangement it will be apparent that full adjustability in horizontal or vertical direction is available without binding and without disturbing the adjustment in one sense by making a separate and additional adjustment in the other sense.

Attention is particularly directed to the fact that the power adjusting unit is supported at one end by the stationary pivot support 64, and the motor and all associated actuating devices forming a part of the power adjusting unit are movable as a unit about this pivot axis. This mounting of the power adjusting unit contributes materially to the freedom of adjustment without binding. At the same time, all of the parts are adequately supported so that when the motor is not being driven, the seat retains its adjusted position, in which it is firmly supported without looseness or play. The fact that the motor in effecting adjustment of the seat operates through a worm and worm gear provides an irreversible driving connection so that the seat remains in whatever adjusted position it occupies when the motor is de-energized.

The drawings and the foregoing specification constitute a description of the improved adjustable vehicle seat and actuating mechanism therefor, in such full, clear, concise and exact terms as to enable any person skilled in the art to practice the invention, the scope of which is indicated by the appended claims.

What we claim as our invention is:

1. An adjustable vehicle seat support structure comprising a pair of forwardly extending seat support members adapted to be connected to opposite ends of a vehicle seat, track structure along which said members are longitudinally slidable, elevating levers connected to opposite ends of said track structure, means for effecting sliding movement of said members along said track structure in any position of vertical adjustment thereof, comprising a torsion bar extending transversely of the vehicle adjacent one end of said members, rigid links connected at opposite ends to said bar, and at least one stabilizing link pivotally connected at one end to one of said rigid links and pivotally connected at its other end to a stationary pivot mounting, said rigid links having pivot connections to said members.

2. An adjustable vehicle seat support structure comprising a pair of forwardly extending seat support members adapted to be connected to opposite ends of a vehicle seat, track structure along which said members are longitudinally slidable, elevating levers connected to opposite ends of said track structure, means for effecting sliding movement of said members along said track structure in any position of vertical adjustment thereof, comprising a torsion bar extending transversely of the vehicle adjacent one end of said members, rigid links connected at opposite ends to said bar, at least one stabilizing link pivotally connected at one end to one of said rigid links and pivotally connected at its other end to a stationary pivot mounting, said rigid links having pivot connections to said members, and an elongated extensible power unit extending from front to rear of said vehicle and pivotally connected at one end to said torsion bar and at the other end to a stationary pivot mounting.

3. An adjustable vehicle seat support structure comprising a pair of forwardly extending seat support members adapted to be connected to opposite ends of a vehicle seat, track structure along which said members are longitudinally slidable, elevating levers connected to opposite ends of said track structure, means for effecting sliding movement of said members along said track structure in any position of vertical adjustment thereof, comprising a torsion bar extending transversely of the vehicle adjacent one end of said members, a rigid arm on said bar, rigid links connected at opposite ends to said bar, at least one stabilizing link pivotally connected at one end to one of said rigid links and pivotally connected at its other end to a stationary pivot mounting, said rigid links having pivot connections to said members, and an elongated extensible power unit extending from front to rear of said vehicle and pivotally connected at one end to the rigid bar on said torsion bar and at the other end to a stationary pivot mounting.

4. An adjustable vehicle seat support structure comprising a pair of forwardly extending rails adapted to be connected to opposite ends of the seat, track structures adjacent opposite ends of the seat along which said rails are slidable, front and rear supporting and adjusting levers connected to each of said track structures to effect generally vertical adjustment thereof, at least one stabilizing link extending fore and aft of the vehicle and having one end pivotally connected to a stationary pivot mount, a pair of actuating links at opposite ends of said seat, a floating torsion bar rigidly connected at its ends to said actuating links, and pivot connections between said actuating links and said rails to effect free sliding movement of said rails in any position of vertical adjustment of said track structure.

5. An adjustable vehicle seat support structure comprising a pair of forwardly extending rails adapted to be connected to opposite ends of the seat, track structures adjacent opposite ends of the seat along which said rails are slidable, front and rear supporting and adjusting levers connected to each of said track structures to effect generally vertical adjustment thereof, at least one stabilizing link extending fore and aft of the vehicle and having one end pivotally connected to a stationary pivot mount, a pair of actuating links at opposite ends of said seat, a floating torsion bar rigidly connected at its ends to said actuating links, pivot connections between said actuating links and said rail to effect free sliding movement of said rail in any position of vertical adjustment of said track structure, and power actuating means comprising an elongated extensible device pivoted at one end to a stationary mount, and pivotally connected at its other end to said floating torsion bar.

6. An adjustable vehicle seat support structure comprising a pair of forwardly extending rails adapted to be connected to opposite ends of the seat, track structures adjacent opposite ends of the seat along which said rails are slidable, front and rear supporting and adjusting levers connected to each of said track structures to effect generally vertical adjustment thereof, links connecting the levers at the same end of said seat, a rotatable torsion bar rigidly connected to corresponding ones of said levers at opposite ends of said seat, at least one stabilizing link extending fore and aft of the vehicle and having one end pivotally connected to a stationary pivot mount, a pair of actuating links at opposite ends of said seat, a floating torsion bar rigidly connected at its ends to said actuating links, pivot connections between said actuating links and said rails to effect free sliding movement of said rails in any position of vertical adjustment of said track structure, and power actuating means comprising an elongated extensible device pivoted at one end to a stationary mount, and pivotally connected at its other end to said floating torsion bar, said rotatable torsion bar having a rigid arm extending radially therefrom, said power actuating means comprising an element movable for and aft of said vehicle, and a link connecting said element and said arm.

7. An adjustable vehicle seat support structure comprising a pair of forwardly extending rails adapted to be connected to opposite ends of the seat, track structures adjacent opposite ends of the seat along which said rails are slidable, front and rear supporting and adjusting levers connected to each of said track structures to effect generally vertical adjustment thereof, at least one stabilizing link extending fore and aft of the vehicle and having one end pivotally connected to a stationary pivot mount, a pair of actuating links at opposite ends of said seat, a floating torsion bar rigidly connected at its ends to said actuating links, pivot connections between said actuating links and said rails to effect free sliding movement of said rails in any position of vertical adjustment of said track structure, and power actuating means comprising an elongated device pivoted at one end to a stationary mount, a screw shaft extending longitudinally thereof, a nut on said shaft, and a link pivotally connecting said said nut to said floating torsion bar.

8. An adjustable vehicle seat support structure comprising a pair of forwardly extending rails adapted to be connected to opposite ends of the seat, track structures adjacent opposite ends of the seat along which said rails are slidable, front and rear supporting and adjusting levers connected to each of said track structures to effect generally vertical adjustment thereof, links connecting the levers at the same ends of said seat, a rotatable torsion bar rigidly connected at its ends to corresponding ones of the levers at opposite ends of said seat, at least one stabilizing link extending fore and aft of the vehicle and having one end pivotally connected to a stationary pivot mount, a pair of actuating links at opposite ends of said seat, a floating torsion bar rigidly connected at its ends to said actuating links, pivot connections between said actuating links and said rails to effect free sliding movement of said rails in any position of vertical adjustment of said track structure, and power actuating means comprising an elongated device pivoted adjacent one end to a stationary mount, said device comprising a pair of aligned, selectively operable threaded shafts extending respectively generally forwardly and rearwardly of the vehicle, nuts on said shafts, one link connecting one of said nuts to said floating torsion bar, said rotatable torsion bar having a rigid arm extending radially therefrom, and a second link connecting the other nut to said arm.

9. An adjustable vehicle seat support structure comprising a pair of rails extending fore and aft of the vehicle adapted to be connected to opposite ends of the seat, elevating mechanisms connected to opposite ends of said rails for effecting substantially vertical movement thereof, traverse mechanism connected to said rails and adapted to effect substantially fore and aft movement thereof, an elongated power actuating unit disposed beneath said seat and between said rails, said unit extending longitudinally of the vehicle, a pivot support connected to said unit and located adjacent one end thereof, said unit including longitudinally movable actuating devices adjacent opposite ends of said unit whereby one of said devices is located closely adjacent to said pivot support so as to have only inconsiderable movement as a result of swinging movement of said unit, means connecting said last mentioned device to one of said mechanisms, and linkage means connecting the other of said devices to the other of said mechanisms to produce pivoting movement of said unit during actuation of said last mentioned mechanism by said last mentioned device.

References Cited by the Examiner

UNITED STATES PATENTS

| | | | |
|---|---|---|---|
| 2,803,146 | 8/1957 | Brundage | 74—424.8 |
| 2,858,878 | 11/1958 | Garvey et al. | 248—419 |
| 2,953,188 | 9/1960 | Garvey et al. | 248—419 |
| 2,980,163 | 4/1961 | Pickles | 248—419 |
| 3,029,660 | 4/1962 | Sears | 74—424.8 |

CLAUDE A. LE ROY, *Primary Examiner.*

BROUGHTON G. DURHAM, FRANK L. ABBOTT,
*Examiners.*